A. H. DE VOE.
BEARING AND OILING MEANS THEREFOR.
APPLICATION FILED OCT. 30, 1918.
1,392,306.
Patented Oct. 4, 1921.
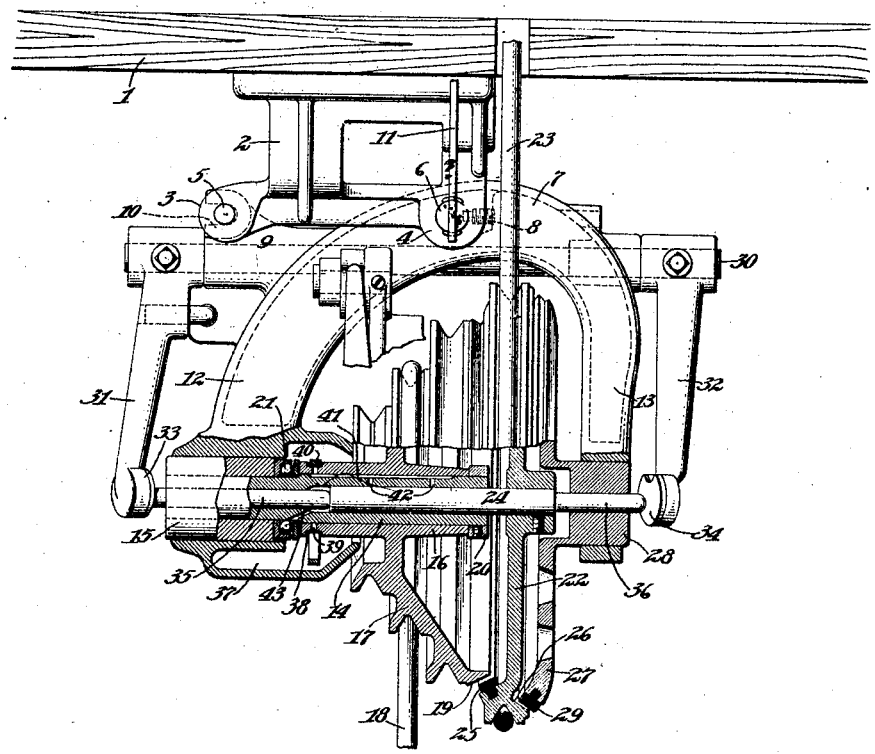
WITNESSES:
INVENTOR
BY
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

BEARING AND OILING MEANS THEREFOR.

1,392,306. Specification of Letters Patent. Patented Oct. 4, 1921.

Original application filed April 1, 1918, Serial No. 225,935. Divided and this application filed October 30, 1918. Serial No. 260,253.

*To all whom it may concern:*

Be it known that I, ALBERT H. DE VOE, a citizen of the United States, residing at Westfield, in the county of Union and State of New Jersey, have invented certain new and useful Improvements in Bearings and Oiling Means Therefor, of which the following is a specification, reference being had therein to the accompanying drawings.

This invention relates to a bearing and oiling means for rotating parts, and more particularly to the bearings for the pulley-wheels of a power-transmitter, such as shown in my copending application Serial No. 225,935, filed April 1, 1918, of which this is a division.

The objects of the invention are to provide a simple, compact and efficient bearing means for rotating parts, and to provide for the certain, efficient and economical lubrication of the bearing means.

The invention in a preferred form, and as applied to a power-transmitter, comprises a hanger having a projecting bearing stud, an oil-well carried by the hanger, driving and driven pulley-wheels, the former having a running bearing on the exterior of the stud and a thrust-bearing within said well, and the latter having a running bearing on the interior of the stud. Means are provided for supplying oil from the well to the exterior running bearing, and ducts lead the oil from the exterior bearing to the interior one, thence to the thrust bearing and back to the well.

In the accompanying drawings, the figure is a side elevation of a power-transmitter, partly in section, showing the bearings for the pulley-wheels and the means for oiling them.

Referring to the drawings, 1 indicates a table-top having secured to its lower side the bracket 2 from which depend a lug 3 and spaced lugs 4. A rod 5 is fixed in the lug 3 and a rod 6 is slidably mounted in the lugs 4. A hanger frame 7 is adjustably secured to the rod 6 by a set-screw 8 which engages screw threads (not shown) on the rod. The frame 7 also has a lug 9 with a channel or fork 10 which latter slidably engages rod 5. By means of a cam-lever 11 the hanger may be shifted on rod 5 in the manner fully explained in my copending application, above mentioned. The hanger has depending arms 12 and 13 of channel-shape. A tubular bearing stud 14 is fixed at one end in a bushing 15 secured in the lower end of the hanger arm 12, the other end of the stud being free. Mounted on the exterior surface of the stud is the tubular hub 16 of the driving pulley 17 of the transmitter, the pulley being connected by a belt 18 with the usual constantly running line shaft, not shown. The driving pulley is formed with an annular friction driving surface 19. The hub 16 is confined against axial movement by a collar 20 at one side and a ball-thrust bearing 21 at the other side. The driven pulley 22 is connected by a belt 23 to the machine to be driven, and is fixed to a stub-shaft 24 journaled within the bearing stud 14 and slidable therein. A leather friction ring 25 is mounted on the driven pulley complementary to the friction driving surface 19 on pulley 17. The driven pulley is also provided with a friction surface 26 on the side opposite the friction ring 25. A brake-disk 27 is fixed in the hanger arm 13 by a hub 28 and carries a leather friction ring 29 of large diameter complementary to the friction surface 26.

Means are provided to shift the driven pulley as follows—a rock-shaft 30 is actuated by a treadle mechanism (not shown) as more fully disclosed in my copending application. Depending from opposite ends of the rock-shaft are arms 31 and 32 carrying cam-surfaces 33 and 34 at their lower extremities. These cam-surfaces are parallel, but inclined to the axis of shaft 24, and engage push-pins 35 and 36, which latter are in engagement with the respective ends of shaft 24. When the rock-shaft is rotated in one direction the push-pin 36 is actuated to move the driven pulley into engagement with the driving pulley, while when the rock-shaft is rotated in the opposite direction the push-pin 35 is actuated to move the driven pulley into engagement with the brake.

At the lower end of the hanger arm 12 is formed an oil-well 37 which surrounds the thrust-bearing 21 and the adjacent portion of the hub 16. An annular groove 38 is cut in the portion of the hub 16 within the oil-well and a series of oil inlets 39 lead from the groove to the interior of the hub. Hung in the groove is an oiling ring 40. An oil distributing groove 41 is formed on the exterior surface of the bearing stud 14 and communicates with the inlets 39. Oil-ducts 42 lead from the groove 41 to the interior surface of the bearing stud, and an oil-duct 43 leads from the interior of the stud to the ball-thrust bearing 21.

In the operation of the transmitter oil is carried by the ring 40 from the well 37 to the inlets 39 in the hub and flowing along the groove 41 lubricates the bearing of the driving pulley. The oil then flows through ducts 42 to the interior of the bearing stud and lubricates the bearing of the driven pulley, and finally flows by way of duct 43 to the ball-thrust bearing and back to the well.

Having thus set forth the nature of the invention, what I claim herein is—

1. In a power-transmitter, in combination, a hanger formed with an oil-well, driving and driven members supported by said hanger, running and thrust bearings for said members, and ports for conducting the oil to said bearings in series and lastly returning the surplus oil to the oil-well, and means for conducting the oil from the well to the ports leading to one of the bearings whereby the oil passes through each of the various bearings of the transmitter and then returns to the supply in the well.

2. In a power-transmitter, in combination, a hanger formed with an oil-cavity including an oil-well, a tubular stud carried by said hanger, a driving pulley journaled on the exterior of said stud, a collar and thrust bearing for fixing the working position of said driving pulley on said stud, said thrust bearing being located within said oil-cavity, a driven pulley journaled within said stud, means for conducting the oil from the oil-well to the external bearing, said tubular stud being provided with a port for conducting the oil from the external to the internal bearing, and a port for conducting the oil from the internal to the ball-thrust bearing from whence it returns to the oil-well.

3. In combination, wheels having concentric bearings, a thrust-bearing for one of said wheels, an oil-well, and means for successively feeding oil from said well through said concentric bearings, the thrust-bearing, and back to the well.

4. In combination, an oil-well, a bearing-stud projecting therefrom, pulley-wheels having bearings exteriorly and interiorly of said stud, a thrust-bearing for one of said wheels, and means for circulating oil from the well to the exterior bearing, to the interior bearing, to the thrust-bearing, and back to the well.

5. In combination, an oil well, a tubular stud passing through said well and having exterior and interior bearing surfaces, a thrust-bearing carried by said stud within said well, a pulley-wheel movable on said exterior bearing surface and in engagement with said thrust-bearing, a second pulley-wheel movable on said interior bearing surface, and means for oiling said bearings in series from said well and returning the oil to the well.

6. In combination, a hanger, a bearing stud supported thereby, an oil-well, a pulley-wheel having a bearing on said stud and a thrust-bearing in communication with said well, a second pulley-wheel having a bearing within said stud, and means for conducting oil from said well to said first pulley bearing, thence through said stud to the second pulley-bearing, and thence again through the stud to the thrust-bearing and to the well.

7. In combination, a support, a pulley-wheel having a shaft, concentric tubular members surrounding said shaft, the inner one being fixed to the support and the outer one carrying a second pulley-wheel, an oil-well surrounding one end of said outer tubular member and a thrust bearing for said member within said well, said outer member being provided with an oil inlet, means for feeding oil to said inlet, an oil distributing groove between said members in communication with said inlet, an oil-duct leading from said groove to the interior of said second member, and an oil-duct leading from said interior outwardly to said thrust-bearing.

In testimony whereof, I have signed my name to this specification.

ALBERT H. DE VOE.